United States Patent Office 3,245,819
Patented Apr. 12, 1966

3,245,819
STABILIZATION OF CALCIUM CARBONATE
SLURRIES
Robert E. Eberts, Trenton, Mich., assignor to Wyandotte
Chemicals Corporation, Wyandotte, Mich., a corporation of Michigan
No Drawing. Filed July 30, 1962, Ser. No. 213,154
2 Claims. (Cl. 106—306)

This invention relates to calcium carbonate slurries and more particularly to stabilizing high solids calcitic calcium carbonate slurries against formation of a nonflowable mass.

Inorganic paper coatings are compositions of pigments and adhesives, suspended in water, which are applied to one or both sides of paper by special apparatus to make it more suitable for printing or to improve its decorative quality.

The pigments which can be employed in inorganic coating formulations include, for example, white minerals such as clay, barites, talc and ground limestone; colored pigments such as ultramarine, umber, siennas, ochers and lakes; powdered metals such as tin, zinc, bronze and aluminum; and synthetic pigments such as titanium dioxide satin white blanc fixe and precipitated calcium carbonate.

The coating colors whether for use in the conversion process or in the on-machine coating method, are, in general, thixotropic and tend to set rigidly upon being applied to the surface of the paper. After the coating color has been applied to the paper the paper is dried in a suitable manner wherein the water from the coating formulation is evaporated. A critical feature of each coating formulation is therefore the ratio of solids to water. Thus a high solids content is particularly desirable in order to reduce the amount of water which must be evaporated. A reduction in the water content of the coating color is of further significance in that it reduces the cost of the coating step as well as permitting a more rapid coating operation. Although a high solids-low water ratio is particularly advantageous in a paper coating formulation the formulation must be flowable. The viscosity of the coating color must be low enough so that it can be handled easily with respect to pumping, flow and ease of application onto the paper.

Precipitated calcium carbonate is one of the principal synthetic pigments employed in paper coatings. For the above reasons, there is a significant advantage to a high solids, low viscosity slurry of calcium carbonate which can be subsequently blended with an adhesive and other suitable adjuncts so as to provide a high solids paper coating having a low viscosity.

Suitable high solids, calcitic calcium carbonate slurries for paper coating purposes generally contain from about 55 to 80 percent calcium carbonate in an aqueous slurry. In order to have a suitable initial low viscosity, from about 0.3 to 2.0 percent by weight of a dispersant is generally included in such slurries with the balance of the slurry being substantially all water and impurities in normal amounts.

It has been found that one particular calcitic calcium carbonate is especially suitable for this purpose. This calcium carbonate is characterized in that it is a finely divided, relatively nonaggregated calcium carbonate having an apparent particle size within the range of about 0.05–0.30 micron as determined by electron micrographs and can be prepared in accordance with the method set forth in U.S. Patent No. 2,964,382, G. E. Hall. In accordance with the disclosure of Hall, finely divided, nonaggregated crystals of calcitic calcium carbonate can be prepared by gradually contacting calcium ions with carbonate ions in an aqueous medium at a pH of at least about 8.5, and in the presence of anti-compositing forces of sufficient intensity and magnitude to establish and maintain substantially all of the crystals of calcium carbonate resulting from the contacting step in a completely segregated condition. The resulting calcium carbonate slurry is removed from the reaction zone, washed to an essentially salt-free condition, dried and then crushed.

Slurries of such calcium carbonate which are well suited for these purposes may be prepared in accordance with U.S. Patent No. 3,006,779, Leaf et al.

While, as pointed out in the Leaf et al. patent, such slurries can often be stored for a week or more without a significant increase in viscosity, it is often desirable to store such slurries for substantially greater periods of time. However, storage of calcitic calcium carbonate slurries for a substantial period of time, generally at about room temperature, i.e. 70° F., presents problems with regard to stability against formation of a nonflowable mass. For example, a 70% solids calcitic calcium carbonate slurry will change from a very fluid material to a nonflowable, i.e. thick, pasty, or even solidified, mass in a period of from about one to four weeks.

Accordingly, it is a purpose of this invention to provide a process for stabilizing high solids, calcitic aqueous calcium carbonate slurries whereby they may be stored for a substantial period of time without the formation of a nonflowable mass.

This invention includes in its scope the stabilization of a high solids content aqueous slurry of calcitic calcium carbonate against formation of a nonflowable mass by maintaining the slurry at a pH greater than about 7.5 In general, the desired high solids slurries contain from about 55 to 80 percent by weight calcitic calcium carbonate and from about 0.3 to 2.0 percent by weight of a suitable dispersant. Typical slurries of this type generally contain about 70% by weight calcitic calcium carbonate and 1% by weight of the dispersant. Any dispersant which will provide the desired initial fluidity in calcitic calcium carbonate slurries may be employed. A suitable dispersant for this purpose is sodium hexametaphosphate. A particularly valuable dispersant which can be effectively employed in such slurries is essentially a three-phase, homogeneous fused product comprising from about 81 to 88 percent by weight of sodium phosphate glass having a molar ratio of sodium oxide to phosphorous pentoxide from about 0.9:1 to about 1.5:1, from about 10 to 15 percent by weight of zinc oxide and from about 0.5 to 8.0 percent by weight of a compound selected from the group consisting of the salt and hydroxide of an alkali metal selected from the group consisting of potassium and lithium. The preferred sodium phosphate glass is modified sodium hexametaphosphate which has a molar ratio of sodium oxide to phosphoric pentoxide of 1.1:1. The potassium and lithium salts which can be fused into, or mechanically admixed with a sodium metaphosphate-zinc oxide glass in order to prepare suitable dispersants include, for example, lithium or potassium metaphosphate or lithium or potassium carbonate. A preferred dispersant contains 83.5% by weight of sodium hexametaphosphate, about 11.5% by weight of zinc oxide and about 5% by weight of potassium metaphosphate. Dispersants containing the above ingredients in the proportions set forth are marketed under the trademark "Calgon T" and are more fully described in U.S. Patent No. 2,750,299, G. D. Hansen, Jr.

The pH of the slurry is maintained above 7.5 and preferably above 8 for practical operations by periodically adding an alkaline agent to the slurry as needed. That is to say, the pH of the slurry may be periodically measured at intervals which experience teaches that the pH tends to go down. In practical operations when the decreasing pH approaches the value of 8, a sufficient amount of alkaline agent is added to the slurry to raise the pH. The addition of the alkaline agent before the pH reaches a value 8 maintains the slurry in a very fluid condition and provides a margin of error against the pH dropping below the minimum of about 7.5. As long as the pH is maintained above about 7.5 the material remains flowable and does not form a thick, pasty mass or a substantially solidified mass. Examples of suitable alkaline agents are calcium hydroxide, sodium hydroxide, barium hydroxide, magnesium hydroxide and potassium hydroxide.

It is most important to maintain the pH above the minimum of 7.5 in order to prevent the formation of a nonflowable, i.e. a thick, pasty or substantially solidified, mass. Although any pH above about 7.5 will stabilize the slurry against formation of a nonflowable mass, it has been found that highly alkaline slurries often have a detrimental effect upon the paper being treated with the slurry. More specifically, slurries having a pH greater than about 10 tend to produce yellowing of the paper being produced. While slurries with a pH slightly above 10 may produce paper which is satisfactory for many purposes, the pH should not be greater than about 11 where appreciable yellowing is not permissible. Where the pH is maintained from about 7.5 to 11, by periodically adding the alkaline agent to the slurry the concentration of the alkaline agent in the stabilized slurry will range from about 0.05 to 0.5 percent by weight of the slurry. Accordingly, by periodically measuring the pH of the aqueous slurry the slurry may be maintained flowable indefinitely and after a series of treatments sufficient to maintain the desired stability for 20 or more days such aqueous slurry would have a composition including from about 55 to 80 percent by weight of calcitic calcium carbonate, about 0.3 to 2 percent by weight of a dispersant and about 0.05 to 0.5 percent by weight of an alkaline agent. In most instances, the balance of the slurry would be water, and impurities in normal amounts.

The following examples further illustrate this invention.

EXAMPLE I 4 kilograms of an aqueous calcitic calcium carbonate slurry containing 75% by weight calcium carbonate and 1% by weight of the previously defined "Calgon T" dispersant was made up in a vessel equipped with a conventional sigma blade mixer by adding calcium carbonate, water and dispersant to the vessel and mixing until an evenly distributed slurry was produced. Water was then added to the slurry during mixing in such quantity as to dilute the 75% slurry to a slurry containing 70% calcium carbonate by weight. Three 770-gram samples of the slurry were placed in conventional rubber gasket sealed glass canning jars. One sample designated as Sample No. 1 in the table below was employed as a control. All samples were sealed, stored and periodically checked for pH after storage for the number of days indicated in the table below and the indicated quantities of 50% sodium hydroxide solution and of calcium hydroxide were added and mixed with Samples Nos. 2 and 3, respectively, in the amounts and at the time intervals indicated in the table below. The pH determinations were made with a Beckman "Zeromatic" pH meter. This meter and its operation are described in Beckman Instruction Manual 514–G, July 1959, by Beckman Instruments, Inc., 2500 Fullerton Road, Fullerton, California.

*Table*

| Number of Days Storage | Sample No. 1 | | Sample No. 2 | | | Sample No. 3 | | |
|---|---|---|---|---|---|---|---|---|
| | pH | Condition of Slurry | pH | Grams of NaOH Added as 50% Aqueous Solution | Total percent by Weight NaOH in Slurry | pH | Grams of Ca(OH)$_2$ Added | Total percent by Weight Ca(OH)$_2$ in Slurry |
| 0 | 9.0 | Flowable | 9.0 | | | 9.0 | | |
| 3 | 8.35 | do | 8.35 | | | 8.35 | | |
| 5 | 8.0 | do | 8.0 | .1875 | .0244 | 8.0 | 1.37 | .178 |
| 5 | | | 8.65 | | .0244 | 8.5 | | .178 |
| 6 | 7.98 | do | 8.4 | | .0244 | 8.45 | | .178 |
| 7 | 7.73 | do | 8.08 | .1125 | .0390 | 8.35 | | .178 |
| 7 | | | 8.65 | | .0390 | | | .178 |
| 10 | 7.63 | Flowability decreased—restored by stirring. | 8.18 | | .0390 | 8.18 | | .178 |
| 12 | 7.63 | do | 8.05 | .1125 | .0537 | 8.05 | .65 | .263 |
| 12 | | | 8.53 | | .0537 | 8.55 | | .263 |
| 14 | 7.5 | Flowability decreased | 8.2 | | .0537 | 9.01 | | .263 |
| 17 | 7.55 | do | 8.13 | | .0537 | 9.13 | | .263 |
| 20 | 7.6 | Nonflowable | 8.12 | | .0537 | 9.13 | | .263 |
| 24 | 7.6 | do | 8.07 | | .0537 | 9.13 | | .263 |
| 28 | 7.65 | do | 8.1 | | .0537 | 9.13 | | .263 |
| 35 | 7.7 | do | 8.18 | | .0537 | 9.13 | | .263 |
| 42 | 7.8 | do | 8.23 | | .0537 | 9.17 | | .263 |
| 49 | 7.79 | do | 8.23 | | .0537 | 9.18 | | .263 |
| 59 | 7.78 | do | 8.35 | | .0537 | 9.17 | | .263 |
| 66 | | | 8.45 | | .0537 | 9.13 | | .263 |
| 73 | | | 8.4 | | .0537 | 9.18 | | .263 |
| 80 | | | | | | 9.18 | | .263 |
| 87 | | | | | | 9.22 | | .263 |
| 94 | | | | | | 9.2 | | .263 |
| 105 | | | | | | 9.06 | | .263 |
| 115 | | | | | | 9.05 | | .263 |

Sample No. 1 was flowable for 10 days. On the tenth day, at which time the pH of Sample No. 1 was 7.63, the flowability of the slurry decreased but was restored by stirring. After 14 days, the flowability decreased substantially and the pH was 7.5. Sample No. 1 was nonflowable after 20 days. Samples Nos. 2 and 3 were flowable throughout the run. Tests were discontinued on Sample No. 2 after 73 days and on Sample No. 3 after 115 days.

From the above, it can be clearly seen that maintaining the pH of an aqueous calcium carbonate slurry, of the type described, above about 7.5 will stabilize such slurry against the formation of a nonflowable mass.

EXAMPLE II 4 kilograms of an aqueous calcitic calcium carbonate slurry containing 75% by weight calcium carbonate and 1% by weight of the previously defined "Calgon T" dispersant was made up in a vessel equipped with a conventional sigma blade mixer by adding calcium carbonate, water and dispersant to the vessel and mixing until an evenly distributed slurry was produced. Water was then added to the slurry during mixing in such quantity as to dilute the 75% slurry to a slurry containing 70% calcium carbonate by weight and 0.3% by weight calcium hydroxide was mixed into the slurry. The initial pH of this slurry was 9.5 and it was highly fluid.

EXAMPLE III 4 kilograms of an aqueous calcitic calcium carbonate slurry containing 75% by weight calcium carbonate and 1% by weight of the previously defined "Calgon T" dispersant was made up in a vessel equipped with a conventional sigma blade mixer by adding calcium carbonate, water and dispersant to the vessel and mixing until an evenly distributed slurry was produced. Water was then added to the slurry during mixing in such quantity as to dilute the 75% slurry to a slurry containing 70% calcium carbonate by weight and 0.05% calcium hydroxide was mixed into the slurry. The initial pH of this slurry was 8.78 and it was highly fluid.

While there has been shown and described hereinabove the preferred embodiments of this invention, it is to be understood that various changes, alterations and modifications can be made thereto without departing from the spirit and scope thereof as defined in the appended claims.

I claim:
1. A process for stabilizing a high solids, aqueous slurry of calcitic calcium carbonate against formation of a nonflowable mass comprising maintaining said slurry at a pH greater than about 7.5 by periodically adding an alkaline agent to said slurry as needed.

2. A process for stabilizing an aqueous slurry containing from about 55 to 80 percent by weight of calcitic calcium carbonate and about 0.3 to 2 percent by weight of a dispersant against formation of a nonflowable mass comprising maintaining said slurry at a pH of from about 7.5 to 11 by periodically adding an alkaline agent to said slurry as needed.

References Cited by the Examiner
UNITED STATES PATENTS

| | | | |
|---|---|---|---|
| 2,140,375 | 12/1938 | Allen et al. | 106—306 |
| 3,006,779 | 10/1961 | Leaf et al. | 106—306 |
| 3,029,153 | 4/1962 | Hackley | 106—306 |

FOREIGN PATENTS

| | | |
|---|---|---|
| 405,391 | 2/1934 | Great Britain. |

ROBERT F. WHITE, *Primary Examiner.*

MORRIS LIEBMAN, ALFRED L. LEAVITT,
*Examiners.*